(12) United States Patent
Jensen et al.

(10) Patent No.: US 10,582,185 B2
(45) Date of Patent: Mar. 3, 2020

(54) AGRICULTURAL WORKING MACHINE

(71) Applicant: CLAAS E-Systems KGaA mbH & Co KG, Dissen A.T.W. (DE)

(72) Inventors: Martin Andreas Falk Jensen, Frederiksberg (DK); Pavel Lisouski, Vanlose (DK); Gert Lysgaard Andersen, Alleroed (DK); Morten Rufus Blas, Kongens Lyngby (DK)

(73) Assignee: CLAAS E-Systems GmbH, Dissen am Teutoburger Wald (DE)

( * ) Notice: Subject to any disclaimer, the term of this patent is extended or adjusted under 35 U.S.C. 154(b) by 56 days.

(21) Appl. No.: 16/013,295

(22) Filed: Jun. 20, 2018

(65) Prior Publication Data

US 2018/0376128 A1     Dec. 27, 2018

(30) Foreign Application Priority Data

Jun. 21, 2017  (DE) .................. 10 2017 113 726

(51) Int. Cl.
*G06T 7/90*       (2017.01)
*H04N 13/204*     (2018.01)
(Continued)

(52) U.S. Cl.
CPC ......... *H04N 13/204* (2018.05); *A01B 69/001* (2013.01); *G06T 7/90* (2017.01); *H04N 13/257* (2018.05); *H04N 13/289* (2018.05); *A01B 63/008* (2013.01); *A01B 69/008* (2013.01); *G06T 7/593* (2017.01); *G06T 7/60* (2013.01); *G06T 2207/10012* (2013.01); *G06T 2207/10024* (2013.01); *G06T 2207/30188* (2013.01);
(Continued)

(58) Field of Classification Search
CPC .......... G06T 2207/10012; G06T 7/593; H04N 13/204

See application file for complete search history.

(56) References Cited

U.S. PATENT DOCUMENTS 6,118,475 A  *  9/2000  Iijima ................ G01C 11/06
                                                348/42
8,155,870 B2     4/2012  Madsen et al.
(Continued)

FOREIGN PATENT DOCUMENTS

DE    102011078292 A1    1/2013
EP         1762129 A1    3/2007
(Continued)

OTHER PUBLICATIONS

European Search Report dated .Oct. 22, 2018 in European Application No. EP 18 16 3839 with English translation of the relevant parts.

*Primary Examiner* — Anshul Sood
(74) *Attorney, Agent, or Firm* — Collard & Roe, P.C.

(57) ABSTRACT

An agricultural working machine, in particular a tractor, has at least one agricultural working unit for working a crop field including a multitude of useful plants, and a camera system which includes a 3D camera. The camera system is configured for generating with the 3D camera 3D information regarding the crop field by recording stereoscopic image pairs along two different viewing axes. The viewing axes proceed from optical centers of the 3D camera, which are connected to each other by a baseline that is inclined relative to the horizontal.

10 Claims, 3 Drawing Sheets

(51) Int. Cl.
*H04N 13/257* (2018.01)
*H04N 13/289* (2018.01)
*A01B 69/00* (2006.01)
 A01B 69/04 (2006.01)
 G06T 7/593 (2017.01)
 A01B 63/00 (2006.01)
 G06T 7/60 (2017.01)
 H04N 13/00 (2018.01)

(52) U.S. Cl.
 CPC ............... *H04N 2013/0077* (2013.01); *H04N 2213/001* (2013.01)

(56) References Cited

U.S. PATENT DOCUMENTS

| | | |
|---|---|---|
| 8,712,144 B2 | 4/2014 | Mas et al. |
| 2007/0050117 A1 | 3/2007 | Kitzler et al. |
| 2012/0072068 A1 | 3/2012 | Madsen et al. |
| 2015/0354943 A1 | 12/2015 | Posselius et al. |
| 2018/0152550 A1* | 5/2018 | Dharmatilleke ..... H04B 1/3888 |

FOREIGN PATENT DOCUMENTS

| | | |
|---|---|---|
| EP | 2135498 A1 | 12/2009 |
| EP | 3171241 A1 | 5/2017 |

* cited by examiner

AGRICULTURAL WORKING MACHINE

CROSS-REFERENCE TO RELATED APPLICATIONS

This application claims priority under 35 USC 119 of German Patent Application No. 10 2017 113 726.2, filed on Jun. 21, 2017, the disclosure of which is herein incorporated by reference.

BACKGROUND OF THE INVENTION

The invention relates to an agricultural working machine.

The term "agricultural working machine" is to be broadly understood in the present case. It includes not only harvesting machines such as combine harvesters and forage harvesters, but also towing vehicles such as tractors, or the like.

Within the scope of the increasing automation of agricultural working machines, such machines are now frequently equipped with camera systems and other sensor systems, in order to assist the operator during driving and in performing agricultural work. In particular, agricultural working units of the agricultural working machine, i.e., components and devices, in particular mounted devices utilized for performing or assisting in agricultural work, can be monitored and controlled in this way.

A known agricultural working machine (U.S. Pat. No. 8,712,144 B2), on which the invention is based, is equipped with a camera system comprising a 3D camera which detects the crop field, in particular ahead of the agricultural working machine, and can generate corresponding 3D information. For this purpose, the 3D camera comprises two camera lenses, via which stereoscopic image pairs can be recorded along two different viewing axes. In this case, the two images axes each proceed from the optical center of the particular camera lens and each extend in one viewing direction. The two camera lenses and, therefore, the optical centers thereof are situated on a so-called baseline in this case, which extends in a horizontal plane. The horizontal plane is relative to the agricultural working machine and extends in parallel to the footprint thereof. In this related art, the optical centers are therefore situated next to each other in a direction which extends in parallel to the surface of the ground to be worked.

The 3D camera of the known agricultural working machine is suitable for scanning the crop field in the direction of travel and for generating 3D information (information regarding the width, height, and depth of objects and/or between objects) therefrom. However, if rows of plants are to be traveled along, for example in order to work the ground between the rows of plants, the detection of the rows of plants or their position is relatively imprecise, since the camera lenses detect the particular row of plants from different directions due to the distance between the camera lenses, i.e., the so-called base. This results in a certain fuzziness of the recorded image and, therefore, an inaccuracy in the 3D information. This, in turn, affects the accuracy of the working of the crop field with the particular agricultural working unit, for example a mechanical hoe or a cultivator. The accuracy is additionally reduced by harmful plants which grow around the useful plants, in particular when the height of the harmful plants is similar to that of the useful plants.

SUMMARY OF THE INVENTION

It is therefore an object of the invention to design and refine the known agricultural working machine in such a way that the working accuracy achieved when a crop field is passed through by an agricultural working unit can be increased.

This object is achieved according to the invention by an agricultural working machine comprising at least one agricultural working unit for working a crop field including a multitude of useful plants, and comprising a camera system (6) which includes a 3D camera, wherein the camera system is configured for generating, by means of the 3D camera, 3D information regarding the crop field by recording stereoscopic image pairs along two different viewing axes, wherein the viewing axes proceed from optical centers of the 3D camera, which are connected to each other by a baseline that is inclined with respect to the horizontal.

Of essential importance is the fundamental consideration that, in the case of a baseline of the 3D camera, i.e., the connecting line between the optical centers of the 3D camera, which is inclined with respect to the horizontal, in particular the horizontal plane, the horizontal distance between the optical centers is less than the base (the absolute distance between the optical centers) of the 3D camera. In the case of an arrangement of the baseline in a vertical plane, i.e., a slant by 90% with respect to the horizontal plane, the optical centers even lie in a common vertical plane, and therefore the horizontal distance between the optical centers is zero. Such an orientation of the 3D camera has the advantage that the two viewing axes or viewing directions of the 3D camera lie closer to each other in the horizontal direction or, in the case of an exactly vertical orientation of the baseline in a vertical plane, are not spaced apart from each other, whereby the substantially vertically growing useful plants and corresponding rows of useful plants can be detected with greater accuracy. In contrast to the related art, in which the baseline extends horizontally between the optical centers, according to the invention, a fuzziness in the edge region of the plants or rows of plants and a corresponding risk of misdetection is reduced or, in the ideal case, is even avoided. The 3D information regarding the crop field, in particular regarding the position and/or the height of the particular useful plant or row of useful plants, which has been generated by the camera system by means of the 3D camera, is therefore substantially more precise than in the related art, which also allows for a more precise working of the crop field, for example with the aid of an agricultural working unit in the form of a mechanical hoe or a cultivator.

The baseline of the 3D camera of the agricultural working machine utilized according to the invention, which connects the optical centers from which the viewing axes proceed, is inclined with respect to a horizontal plane and preferably extends in a vertical plane. The 3D camera is, in particular, a stereo camera, i.e., a camera comprising, in particular, two camera lenses for recording stereoscopic half-images. Special variants of the stereo cameras also comprise more camera lenses, for example four camera lenses, and are included in the aforementioned stereo camera. Also included are cameras comprising only one camera lens, which can also generate stereoscopic image pairs from half-images via an optical attachment. In principle, it is also conceivable to provide two individual cameras, each of which generates individual images which are combined and converted to form stereoscopic image pairs. A feature in common to all these 3D cameras is that they can detect the crop field, in particular ahead of the agricultural working machine and/or ahead of the agricultural working unit, and can generate 3D information regarding the field crop by recording stereoscopic image pairs along two different viewing axes, wherein the viewing axes proceed from optical centers of the 3D camera or the individual lens which, in turn, are connected to each other via the aforementioned baseline.

In some embodiments, the camera system and/or the 3D camera are/is also adjustable, in particular being pivotable and/or height-adjustable. The pivotability makes it possible to change the angle of the viewing axes with respect to the horizontal plane or the ground. The height-adjustability makes it possible to adjust the optical centers or the particular starting point of the two viewing axes in the vertical. Both of these allow for an individual adaptation to different types of useful plants and/or kinds of crop.

In another embodiment, 3D information which can be generated by means of the 3D camera is specified, which can be, in particular, information regarding the plant height of the useful plants, the plant spacing of the useful plants transversely (orthogonally) to the direction of travel, i.e., the distance between the rows of plants, the plant spacing of the useful plants in the direction of travel and/or information regarding plant parts such as leaves and stalks of the useful plants. The 3D information can also contain information regarding harmful plants, however, including information, in particular, in this case, regarding the plant height of the harmful plants, the plant spacing of the harmful plants transversely to the direction of travel, the plant spacing of the harmful plants in the direction of travel, etc.

The camera system can be configured to also generate color information regarding the crop field by means of the 3D camera. Therefore, for example, useful plants can be distinguished from harmful plants and/or useful plants can be distinguished from the arable land. The color information can also be color information regarding plant parts of the useful plants and/or the harmful plants. For example, the stalks can be distinguished from leaves or cases of lignification can be detected on the basis of different colors. Findings regarding the level of maturity and/or the nitrogen content can also be obtained as a result.

The 3D camera can be switched between a 3D mode and a 2D mode. In the 3D mode, the aforementioned 3D information is generated, and in the 2D mode, the color information is generated. The totality of information, i.e., 3D information and color information, can be subsequently utilized, overall, for determining the height and/or position of the useful plants and/or harmful plants as exactly as possible. In this case, it is conceivable that, in the 2D mode, monoscopic individual images, i.e., individual images without 3D information, are recorded along one of the viewing axes and are processed. In particular, in order to generate such individual images in the 2D mode, only one camera lens of the 3D camera is active, in order to generate the particular individual image. It is also conceivable, however, that monoscopic individual images are generated via two or more camera lenses of the 3D camera, and are subsequently processed. It is also conceivable to break down the stereoscopic image pairs of half-images, which can be generated by the 3D camera, into individual images and to process the individual images individually in the 2D mode, in order to generate the corresponding color information on the basis thereof.

In addition to the aforementioned camera system comprising the 3D camera, which forms a first sensor system, it is further possible to provide at least one further sensor system which can generate sensor data with the aid of at least one sensor. The sensor can be, for example, a speed sensor, a working height sensor (for detecting the working height of the working unit), or a steering angle sensor.

All these sensor data, i.e., the 3D information, the color information, and/or the further sensor data, can be utilized by a driver assistance system of the agricultural working machine, in order to automatically control the agricultural working machine and/or the agricultural working unit. In particular, as a result, the agricultural working unit can be optimally oriented with respect to the rows of plants.

BRIEF DESCRIPTION OF THE DRAWINGS

The invention is explained in the following in greater detail with reference to a drawing representing only one exemplary embodiment. In the drawings.

DETAILED DESCRIPTION OF THE EMBODIMENTS

Figure 1:
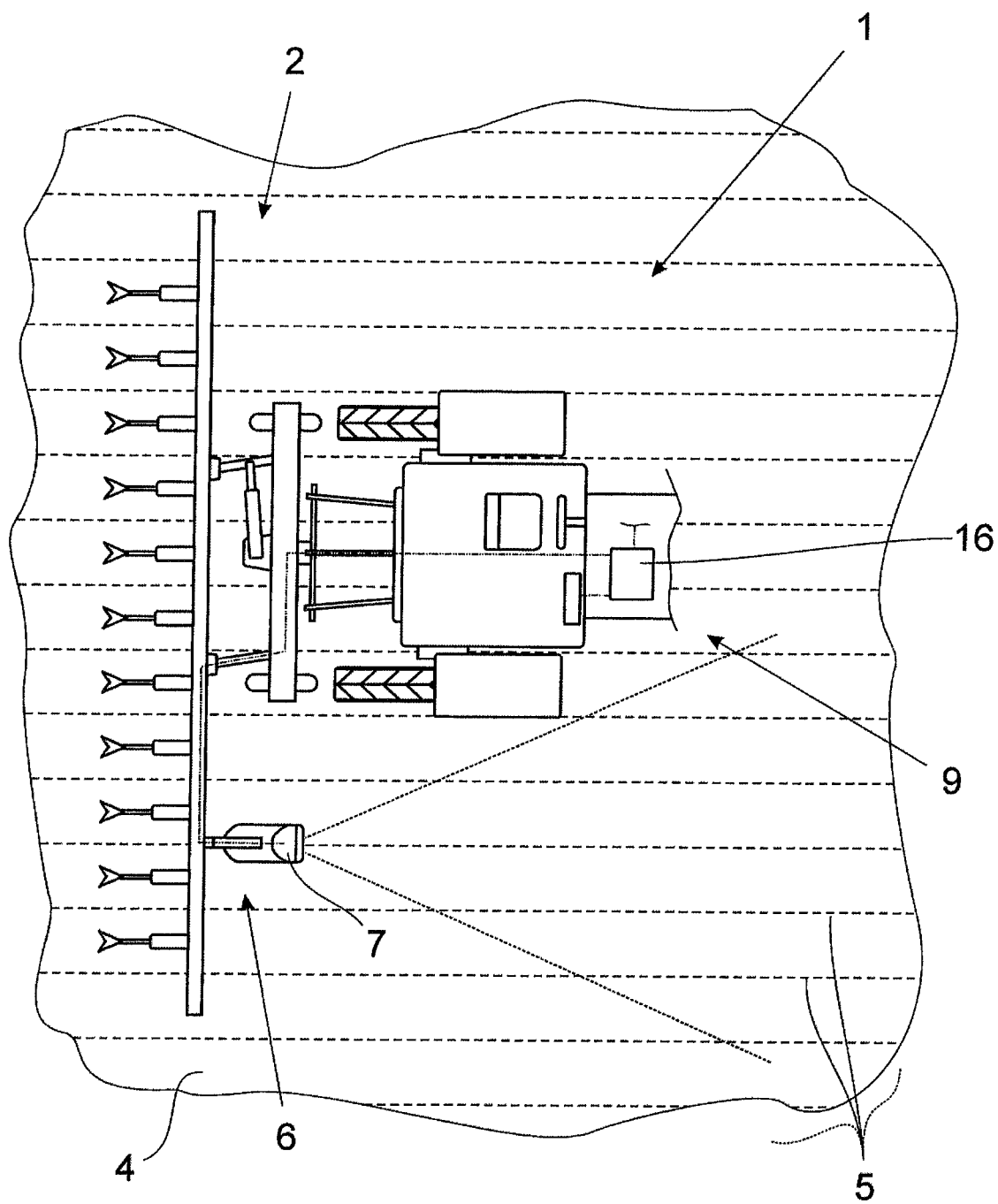
FIG. 1 shows an agricultural working machine according to the invention, comprising an agricultural working unit, in an operating situation.

The approach according to the invention can be applied on a wide range of agricultural working machines, in particular self-propelled agricultural working machines. These include towing machines, in particular tractors, and harvesting machines, in particular combine harvesters, forage harvesters, or the like. In the exemplary embodiment which is depicted and, in this respect, is preferred, the agricultural working machine 1 is a tractor which is equipped in the usual way with an agricultural working unit 2 in the form of a mounted device. In this case, the agricultural working unit 2 is, for example, a mechanical hoe or a cultivator. The comments made with respect to a tractor or such an agricultural working unit apply similarly for all other types of agricultural working machines or agricultural working units.

The agricultural working machine 1 and the agricultural working unit 2 are operated by an operator, i.e., the driver, wherein a driver assistance system 16 is provided as operator assistance, which can automatically control the speed and/or the steering angle of the agricultural working machine 1 and/or the working height of the agricultural working unit 2. The control of the agricultural working machine 1 and/or the agricultural working unit 2 by the driver assistance system 16 allows for a particularly precise working of a field crop comprising a multitude of useful plants. For example, with the aid of the agricultural working unit 2 represented here in the form of a mechanical hoe or a cultivator, the ground 4 between the useful plants can be worked in a particularly precise and comprehensive manner, for example being broken up, without damaging the useful plants 3. The area between the useful plants 3 is detected particularly precisely in this case, even when the area is covered by harmful plants (weeds). In particular, rows of plants 5 comprising multiple useful plants 3 can be detected particularly exactly, which will be explained in greater detail in the following.

The agricultural working machine 1 according to the invention comprises a camera system 6 including a 3D camera 7 which, in this case and preferably, is a stereo camera comprising two camera lenses 8a and 8b. The 3D camera 7 is mounted on the agricultural working unit 2 in this case and preferably, although it can also be situated, in principle, on the vehicle 9 on which the working unit 2 is mounted.

Figure 2:
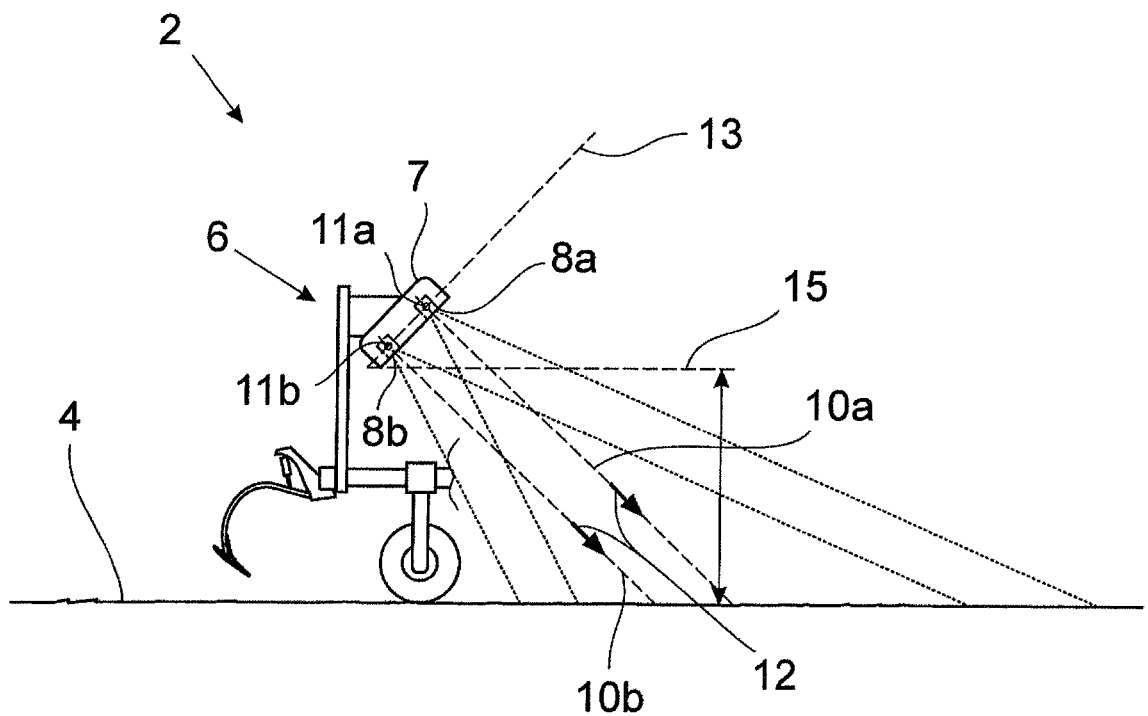
FIG. 2 shows a side view of the agricultural working unit of the agricultural working machine from FIG. 1 comprising an installed 3D camera.

The camera system 6 is configured for detecting, by means of the 3D camera, the field crop, i.e., the useful plants 3 or rows of plants 5 comprising useful plants 3, in particular ahead of the agricultural working unit 2 in the direction of travel, and generating corresponding 3D information regarding the field crop, in that stereoscopic image pairs are recorded with the aid of the 3D camera 7 along two different viewing axes 10a, 10b. In this case, the viewing axes 10a, 10b are defined as the axes which extend from the optical centers 11a, 11b of the 3D camera 7 or the camera lenses 8a and 8b of the 3D camera 7 in the viewing direction 12. As FIG. 2 shows here, by way of example, the viewing direction 12 of the 3D camera 7 is inclined by approximately 45° with respect to the horizontal plane 15 in this case. The optical centers 11a, 11b of the 3D camera 7 are connected to each other via a baseline 13 which is inclined with respect to the horizontal plane 15, also by 45° in this case. As shown in FIG. 2, the baseline 13 extends, in this case and preferably, in a plane 14 which extends orthogonally to the horizontal plane 15.

Figure 3A:
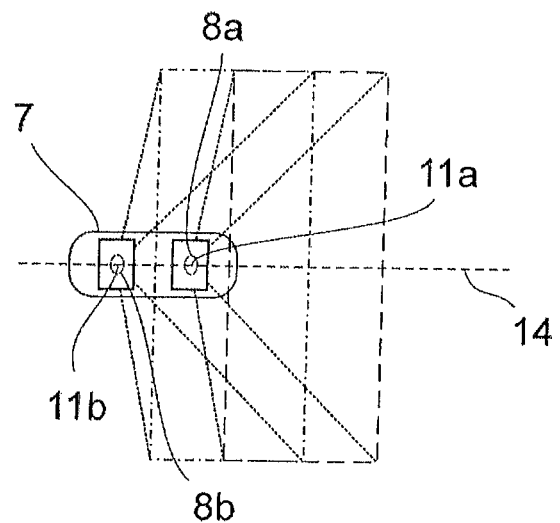
FIG. 3a shows a top view of the 3D camera of the agricultural working machine from FIG. 1.
Figure 3B:
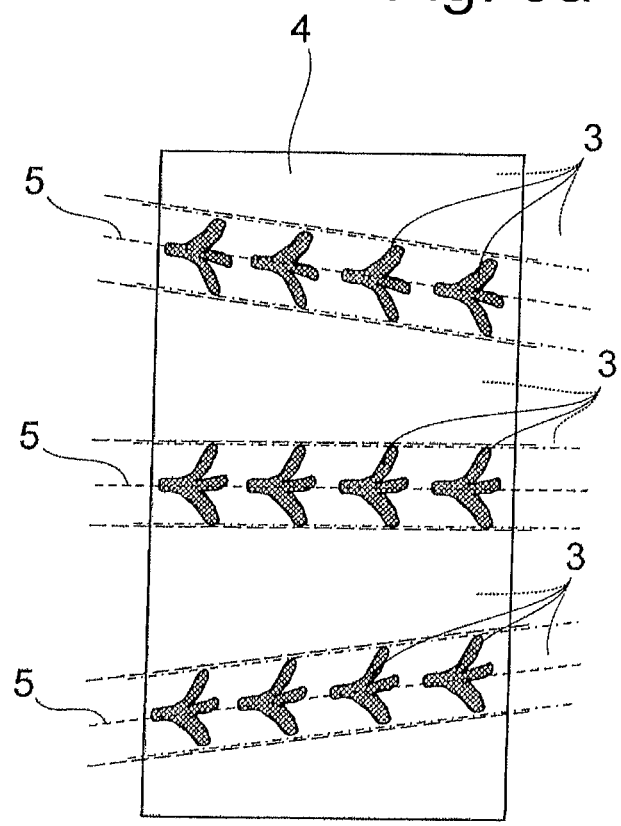
FIG. 3b shows the area of the crop field which is detectable by the 3D camera.

The advantage of such an orientation of the camera system 6 or the 3D camera 7 is that the viewing axes 10a, 10b, in this case and preferably, extend in one and the same vertical plane 14 and, therefore, do not have horizontal separation from each other in this case. In the related art, such a horizontal separation or offset has made it impossible to exactly detect the rows of plants 5. The agricultural working machine 1 according to the invention reduces or prevents errors due to such an offset in the horizontal. In this way, individual useful plants 3 or rows of plants 5 can be particularly precisely detected with respect to their position and/or plant height, which is represented in FIG. 3b (in this case, there is no significant offset between the boundary lines of the rows of plants 5 ascertained with the aid of the 3D camera 7), and, therefore, the crop field can be worked particularly precisely and comprehensively, as explained above.

It is particularly preferred when the camera system 6 and/or the 3D camera 7 is pivotable and/or height-adjustable in the vertical in a plane inclined with respect to the horizontal plane 15, in particular in a plane 14 orthogonal to the horizontal plane 15. In this way, the 3D camera 7 can be adapted to different conditions, in particular to different types of useful plants and/or kinds of crop.

As previously indicated, the 3D camera 7 comprises two camera lenses 8a and 8b, in this case and preferably, proceeding from which an assigned viewing axis 10a and 10b, respectively, extends. In principle, it is also conceivable, however, that the 3D camera 7 comprises only a single camera lens and comprises an optical attachment (not shown) generating the image pairs. The use of two individual cameras (not shown) is also conceivable, in order to generate appropriate stereoscopic image pairs.

The 3D information generated by means of the 3D camera 7, in this case and preferably, is information regarding the plant height of the useful plants 3, regarding the plant spacing of the useful plants 3 transversely to the direction of travel and, therefore, the distance between the rows of plants 5, regarding the plant section of the useful plants 3 in the direction of travel and/or regarding plant parts of the useful plants 3, the latter in particular for distinguishing between leaves and stalks of the useful plants 3. In principle, it is also conceivable to generate, as 3D information, information regarding the plant height of harmful plants, the plant spacing of harmful plants transversely to the direction of travel, the plant spacing of harmful plants in the direction of travel, or the like.

The camera system 6 or 3D camera 7 utilized according to the invention is additionally configured, in this case and preferably, for generating color information, in particular color information regarding the crop field and/or plant parts. Color information regarding the crop field makes it possible to distinguish between useful plants 3 and harmful plants and/or between useful plants 3 and the ground 4. Color information regarding plant parts includes, for example, the color of stalks and the color of leaves, with the aid of which stalks and leaves can be distinguished from each other, which is advantageous in windy conditions, in particular. The color within a stalk or within the useful plants 3 can also be detected as part of the color information and provides information on the extent of the lignification of stalks or the like, which, in turn, can be used as information for adjusting agricultural working units utilized for harvesting, in particular for adjusting the working height thereof.

On the basis of the color information, conclusions can also be drawn regarding the level of maturity and/or the nitrogen content of the plants or the ground, which can also be incorporated into the control of the agricultural working machine 1 and/or the agricultural working unit 2.

The 3D camera 7 can be switched between a 3D mode and a 2D mode, in this case and preferably, wherein the 3D camera 7 in the 3D mode generates the aforementioned 3D information and, in the 2D mode, generates the aforementioned color information.

For example, the color information can be initially gathered in the 2D mode, with the aid of which useful plants 3 can be distinguished from the ground 4. If several harmful plants are now growing between the useful plants 3, the color information is only partially helpful, however, since essentially everything appears to be green. In this case, the 3D mode is additionally switched to, whereby 3D information, in particular the plant height of the individual plants, can be detected, whereby it is possible to distinguish between (high growing) useful plants 3 and (low growing) harmful plants or weeds.

It is also conceivable to initially utilize the 3D mode in order to obtain height information regarding the useful plants 3 as 3D information. In this case, it may happen, however, in particular when the useful plants 3 have sprouted relatively recently and have not yet reached a tall growing height, that a sufficiently reliable distinction between useful plants 3 and ground 4 cannot be reached solely on the basis of the 3D information, due to uneven ground. In this case, the area of the (green) useful plants 3 can be additionally distinguished from the (brown) ground 4 in the 2D mode via the generation of color information.

The 2D mode makes it possible, in particular, to record monoscopic individual images, i.e., images without 3D information, along one of the image axes 10a, 10b and to further process the images to obtain the appropriate color information. Alternatively, it is also conceivable to utilize the stereoscopic image pairs generated in the 3D mode, in that the individual image pairs which form the stereoscopic image pairs are processed individually, in order to generate the color information on the basis thereof.

In addition to the above-described camera system 6 comprising a 3D camera 7, the agricultural working machine 1 and/or the agricultural working unit 2 can each comprise even further sensor systems including sensors which are known per se, such as speed sensors, working height sensors, and/or steering angle sensors (not shown). The generated sensor data, also including the 3D information and, in particular, color information, can then be utilized by a driver assistance system 16 of the agricultural working machine 1 for automatically controlling the agricultural working machine 1 and/or the agricultural working unit 2, as mentioned at the outset.

LIST OF REFERENCE SIGNS 1 agricultural working machine
2 agricultural working unit
3 useful plants
4 ground
5 rows of plants
6 camera system
7 3D camera
8a, 8b camera lenses
9 vehicle
10a, 10b viewing axes
11a, 11b optical centers
12 viewing direction
13 baseline
14 plane of the baseline
15 horizontal plane
16 driver assistance system

What is claimed is:

1. An agricultural working machine, comprising:
at least one agricultural working unit configured for working a crop field including a multitude of plants,
a camera system which includes a 3D camera, the camera system being configured for generating, by means of the 3D camera, 3D information regarding the crop field by recording stereoscopic image pairs along two different viewing axes, wherein the viewing axes proceed from optical centers of the 3D camera, said optical centers being connected to each other by a baseline that is inclined with respect to horizontal,
wherein the camera system is configured for generating, by means of the 3D camera, color information regarding the crop field, and/or color information regarding plant parts of the plants to distinguish between different types of the plants, and
wherein the 3D camera is configured to be switched between a 3D mode, in which the 3D information is generated, and a 2D mode, in which the color information is generated.

2. The agricultural working machine as claimed in claim 1, wherein the baseline extends in a plane which extends orthogonally to a horizontal plane.

3. The agricultural working machine as claimed in claim 1, wherein the camera system and/or the 3D camera are/is pivotable in a plane that is inclined with respect to a horizontal plane.

4. The agricultural working machine as claimed in claim 1, wherein the 3D camera is height-adjustable.

5. The agricultural working machine as claimed in claim 1, wherein the 3D camera comprises two camera lenses, from each of which one of the two viewing axes proceeds.

6. The agricultural working machine as claimed in claim 1, wherein the 3D camera comprises one single camera lens and an optical attachment generating the image pairs.

7. The agricultural working machine as claimed in claim 1, wherein the 3D camera system is configured to distinguish between the types of plants and categorize the plants as useful plants and harmful plants, and wherein the 3D camera is configured to generate 3D information regarding at least one of the following:
plant height of the useful plants,
plant spacing of the useful plants transversely to a direction of travel,
plant spacing of the useful plants in the direction of travel,
plant parts of the useful plants,
plant height of harmful plants between the useful plants,
plant spacing of the harmful plants between the useful plants transversely to the direction of travel,
plant spacing of harmful plants between the useful plants in the direction of travel, and
plant parts of the harmful plants between the useful plants.

8. The agricultural working machine as claimed in claim 1, wherein in the 2D mode, the 3D camera is configured for recording and processing monoscopic individual images are recorded along one of the viewing axes, or individually processing the individual images forming the stereoscopic image pairs, in order to generate the color information.

9. The agricultural working machine as claimed in claim 1, wherein the agricultural working machine further comprises at least one sensor arrangement which includes at least one sensor, which generates sensor data, the at least one sensor being selected from the group consisting of a speed sensor, a working height sensor, and a steering angle sensor.

10. The agricultural working machine as claimed in claim 9, wherein the agricultural working machine comprises a driver assistance system which controls the agricultural working machine and/or the agricultural working unit depending on at least one of the 3D information, color information, and the sensor data.

* * * * *